(12) United States Patent
Phillips

(10) Patent No.: US 7,096,010 B2
(45) Date of Patent: Aug. 22, 2006

(54) METHOD AND APPARATUS FOR DEFINING AND EXECUTING FEATURES IN A PERSONAL WIRELESS HANDSET

(75) Inventor: Marc S. Phillips, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 580 days.

(21) Appl. No.: 09/727,240

(22) Filed: Nov. 30, 2000

(65) Prior Publication Data

US 2002/0065069 A1   May 30, 2002

(51) Int. Cl.
*H04M 3/00* (2006.01)
(52) U.S. Cl. ............... 455/418; 455/550.1; 455/575.1
(58) Field of Classification Search ............ 455/550.1, 455/563, 567, 569.2, 575.1, 90.3, 90.2
See application file for complete search history.

(56) References Cited

U.S. PATENT DOCUMENTS

| | | | | |
|---|---|---|---|---|
| 6,002,946 | A * | 12/1999 | Reber et al. ............... | 455/557 |
| 6,122,530 | A * | 9/2000 | Overy et al. ............... | 455/566 |
| 6,125,287 | A * | 9/2000 | Cushman et al. ........... | 455/566 |
| 6,185,295 | B1 * | 2/2001 | Frederiksen et al. ... | 379/355.05 |
| 6,212,408 | B1 * | 4/2001 | Son et al. ................... | 455/563 |
| 6,360,110 | B1 * | 3/2002 | Schmidt ..................... | 455/564 |
| 6,370,519 | B1 * | 4/2002 | Kim ............................. | 707/1 |
| 6,449,476 | B1 * | 9/2002 | Hutchison et al. .......... | 455/418 |
| 6,580,928 | B1 * | 6/2003 | Aoki .......................... | 455/566 |
| 6,594,484 | B1 * | 7/2003 | Hitchings, Jr. ........... | 455/414.1 |

* cited by examiner

*Primary Examiner*—Temica Beamer
(74) *Attorney, Agent, or Firm*—Philip Wadsworth; Charles D. Brown; Kenyon S. Jenckes

(57) ABSTRACT

The invention comprises a method and apparatus for enabling a user of a personal wireless communication handset to define a macro for selectively operating a feature of the personal wireless communication handset and store the macro in the device's memory. The user can then playback the macro to effect rapid operation of the feature. The macro can be triggered by pressing a dedicated "hot key", by pressing an overloaded existing key on the keypad, or by pressing a "soft key" under a menu-driven user interface.

25 Claims, 5 Drawing Sheets

METHOD AND APPARATUS FOR DEFINING AND EXECUTING FEATURES IN A PERSONAL WIRELESS HANDSET

FIELD OF THE INVENTION

The invention relates generally to communication systems. More particularly, the invention relates to creating, storing and accessing macros for executing features in a communication system.

BACKGROUND OF THE INVENTION

FIG. 1 is a block diagram showing a typical modern wireless communication system 10. The system is comprised of a series of base stations 14. A set of personal wireless communication handsets 12 communicate with the base stations 14. The personal wireless communication handsets 12 communicate with the base stations 14 over a forward link channel 18 and a reverse link channel 20. FIG. 1 shows a variety of types of personal wireless communication handsets. For example, FIG. 1 shows a hand-held portable telephone, a vehicle mounted mobile telephone and a fixed-location, wireless, local-loop telephone. Such systems offer voice and data services. Other modern communication systems operate over wireless satellite links rather than through terrestrial base stations.

Handsets, such as cellular or PCS telephones, are commonly used in the above-described system. FIG. 2 shows a typical cellular handset 20. The handset 20 has a keypad section 22, a display portion 24, and an antenna 26. A power switch 28 to turn the handset on or off is also provided. The keypad section 22 comprises a numerical keypad 30, two soft keys 32, 34 and an up/down toggle key 36. The soft keys 32, 34 serve to select the option shown directly above them in the display portion 24.

Modern electronic products, including such handsets, typically offer numerous features or options to be selected by the user. The features offered in handsets may include, among others, a mute capability, a choice of rings to announce incoming calls, a vibrate-mode instead of a ring, and a selector defining the size of the display.

Such options and features are generally accessed via a menu-driven user interface. A menu system typically has several levels of hierarchy to reach desired features or options. As the number of features and options increase, the user is required to proceed through an increasingly greater number of hierarchical levels to reach the desired setting.

For example, a user of a typical handset may wish to set his handset to vibrate instead of ring in announcing an incoming call while he is in a meeting or at the office. Prior to entering the meeting or the office, he must go through a procedure such as the following, using the user interface of the handset, described with reference to FIGS. 3a–3d. First, he must press the "MENU" soft key 34, as shown in FIG. 3a, to access the menu options. Then, referring to FIG. 3b, he must use the up/down toggle key 36 to select one of the options, "PHONE SETTINGS", as shown on the display 24 which contains the desired setting. He must then press the "SELECT" soft key 34. In FIG. 3c, The user must again select one of the options, "RING SETTINGS", as shown on the display 24, and press the "SELECT" soft key 34. Finally, in FIG. 3d, he selects "VIBRATE" from the choices illustrated on the display 24, and then presses the "SELECT" soft key 34 to complete the selection. Upon exiting the meeting or the office, the user must repeat this cumbersome procedure to set the handset to ring to announce an incoming call.

A user may be required to go through these steps on a regular basis if he must regularly toggle his handset between ring and vibrate.

Even if a user does not regularly use a feature, he may wish to have that feature be readily accessible. For example, a user may want to use the "mute" function offered by a handset when he does not wish the party on the other end to hear what is being said. In such an instance, the user may not have the time to go through a lengthy, menu-driven process to mute the handset. Although this feature may not be used on a regular basis, it must be readily available when needed.

Consequently, to access a feature or to change an option, a user must extensively navigate the several levels of the menu system, requiring the user to enter several key presses on the keypad. This can be time consuming, inconvenient and confusing, and often results in users not utilizing the capabilities of their cellular phones.

A method or apparatus is needed to allow users to readily access any desired feature, even if the feature is deeply embedded in the hierarchical menu structure. Thus, there is a need to allow users to design their own shortcuts to provide quick access to the user's preferred settings and features. There is also a need to allow users to activate several features or settings at once by combining the activation steps into a single shortcut step.

SUMMARY OF THE INVENTION

The invention comprises a method of enabling a user of a personal wireless communication handset to define a macro for selectively operating a feature of the personal wireless communication handset and to store the macro in the handset's memory. The user can then playback the macro to effect rapid operation of the feature. The macro can be triggered by pressing a dedicated "hot key", by pressing an overloaded existing key on the keypad, or by pressing a "soft key" under a menu-driven user interface.

In one embodiment, the invention comprises a method of programming a macro to selectively operate features of a personal wireless communication handset, the method including the steps of initiating a program mode in a controller of the handset; entering a sequence of inputs using a user interface; storing the sequence of inputs in a memory; defining a procedure for retrieving the sequence of inputs from the memory; and initiating the procedure to retrieve the sequence of inputs from the memory so that the macro is performed to operate selected features of the handset.

In another embodiment, the invention comprises a personal communication handset including a display; a user-interface; a controller coupled to the display and configured to communicate with the display so as to display a set of text descriptions allowing a user to view the features of the personal communication handset, the controller also coupled to the user-interface and configured to receive commands from the user-interface to access features of the personal communication handset; a memory device coupled to the controller, such that said controller can retrieve data stored on said memory device; and a macro program stored in the memory device, the macro program comprising a set of user-interface inputs to control at least one feature of the wireless communications device.

BRIEF DESCRIPTION OF THE DRAWINGS

The features, objects and advantages of the invention will become more apparent from the detailed description set forth below when taken in conjunction with the drawings in which like references characters identify correspondingly throughout, and wherein.

DETAILED DESCRIPTION OF THE INVENTION

Figure 4:
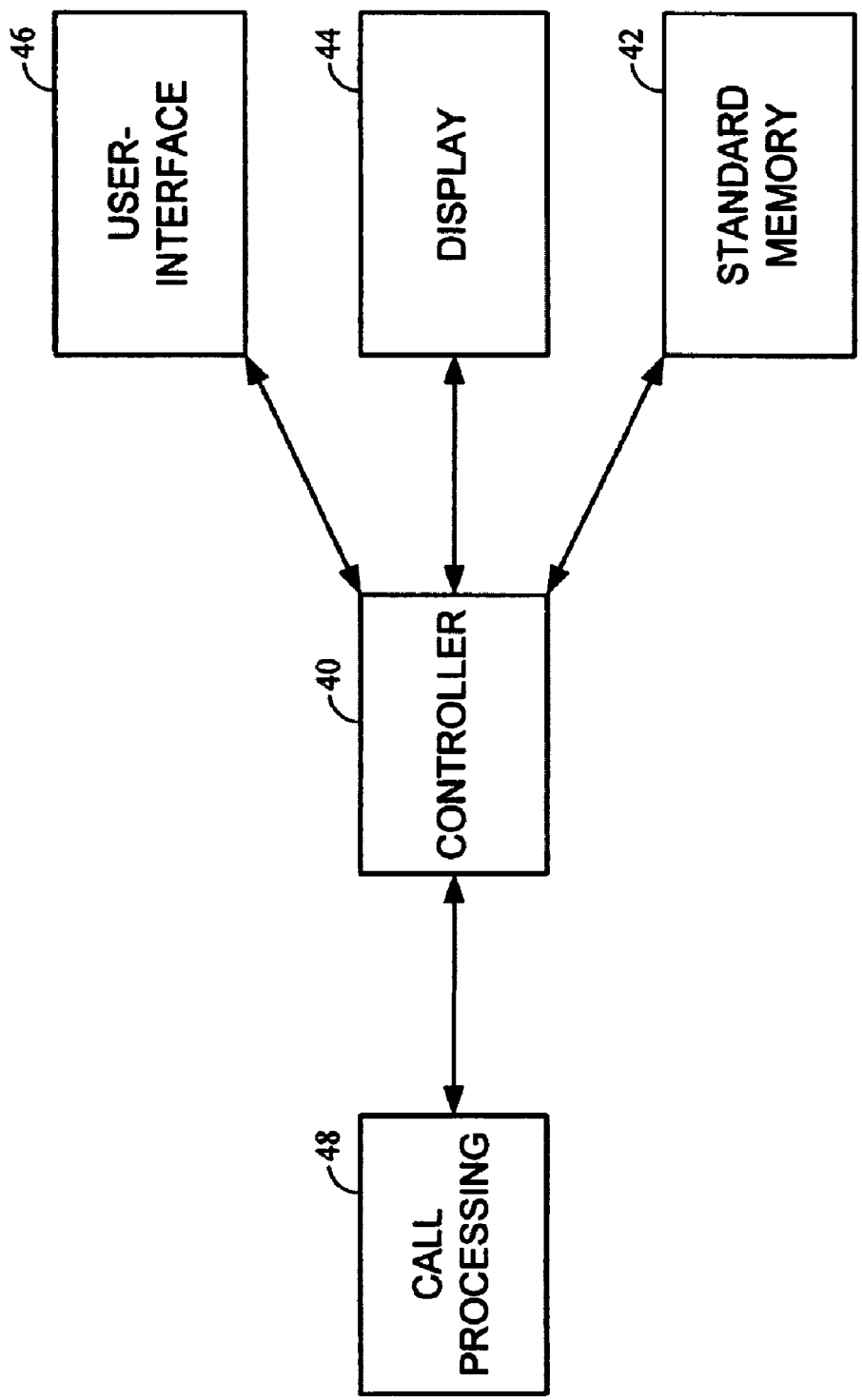
FIG. 4 is a block diagram showing a wireless remote unit in accordance with the present invention.

FIG. 4 is a block diagram of a personal wireless communication handset 20 in accordance with the invention. The personal wireless communication handset 20 comprises a controller 40, a standard memory 42, a display 44, a user-interface 46 and a call-processing unit 48. The controller 40 can be a microprocessor or other general controller or it can comprise an application specific integrated circuit (ASIC). The controller 40 is coupled to the standard memory 42, and is configured to retrieve digital data from the standard memory 42. The standard memory 42 comprises a programmable storage device (not shown) that retains programs. For example, the programs to be executed by the controller 40 can be stored on the standard memory 42. In accordance with the present invention, the standard memory 42 may store a sequence of user-interface inputs corresponding to an assigned macro, as will be described below.

The controller 40 is also coupled with the display 44, which can be a liquid crystal display (LCD), for example. In accordance with the invention, the controller 40 can be configured to command the display 44 to display prompts for inputs to program a macro.

Figure 1:
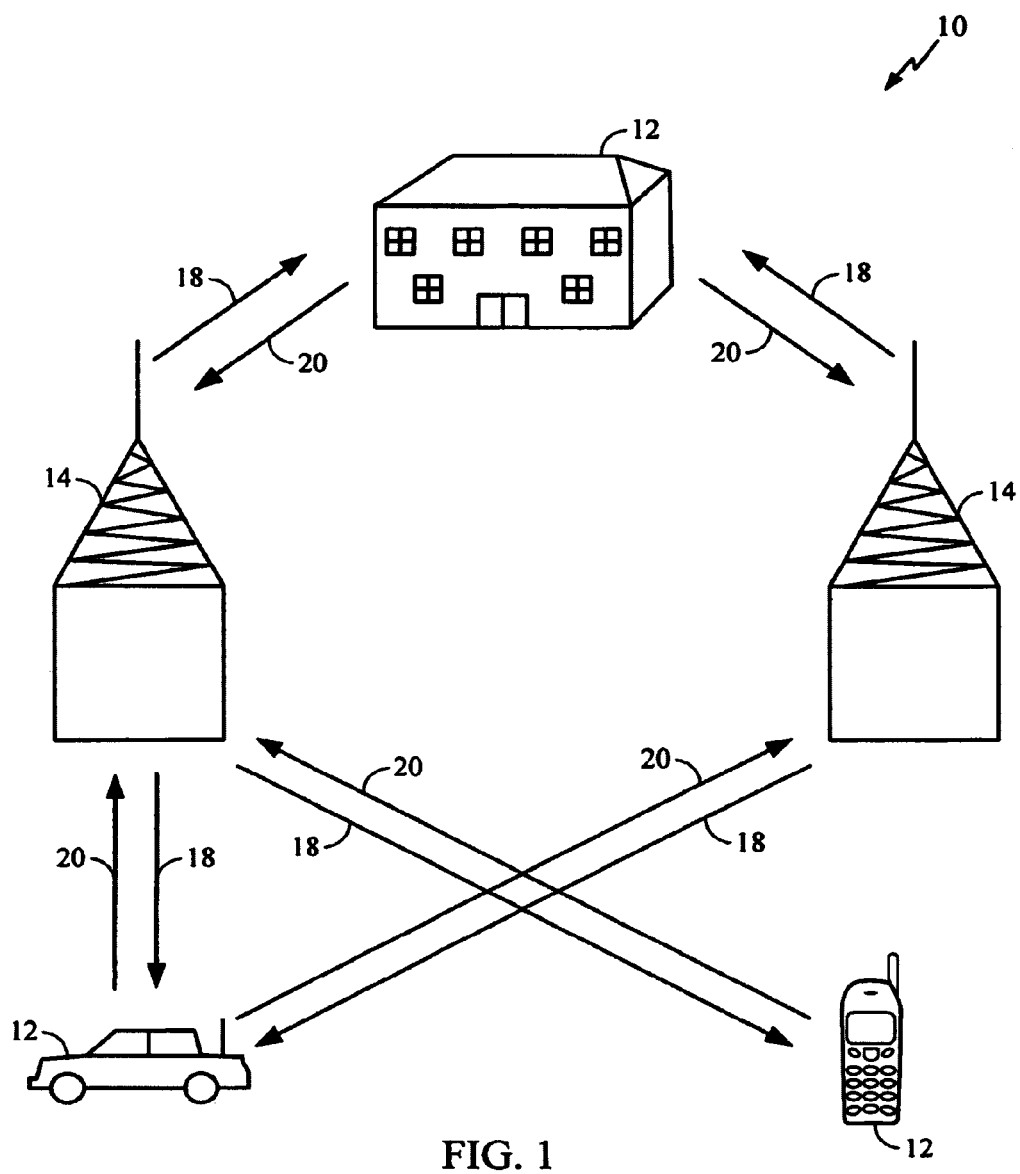
FIG. 1 is a representative diagram showing a typical modem wireless communication system.
Figure 2:
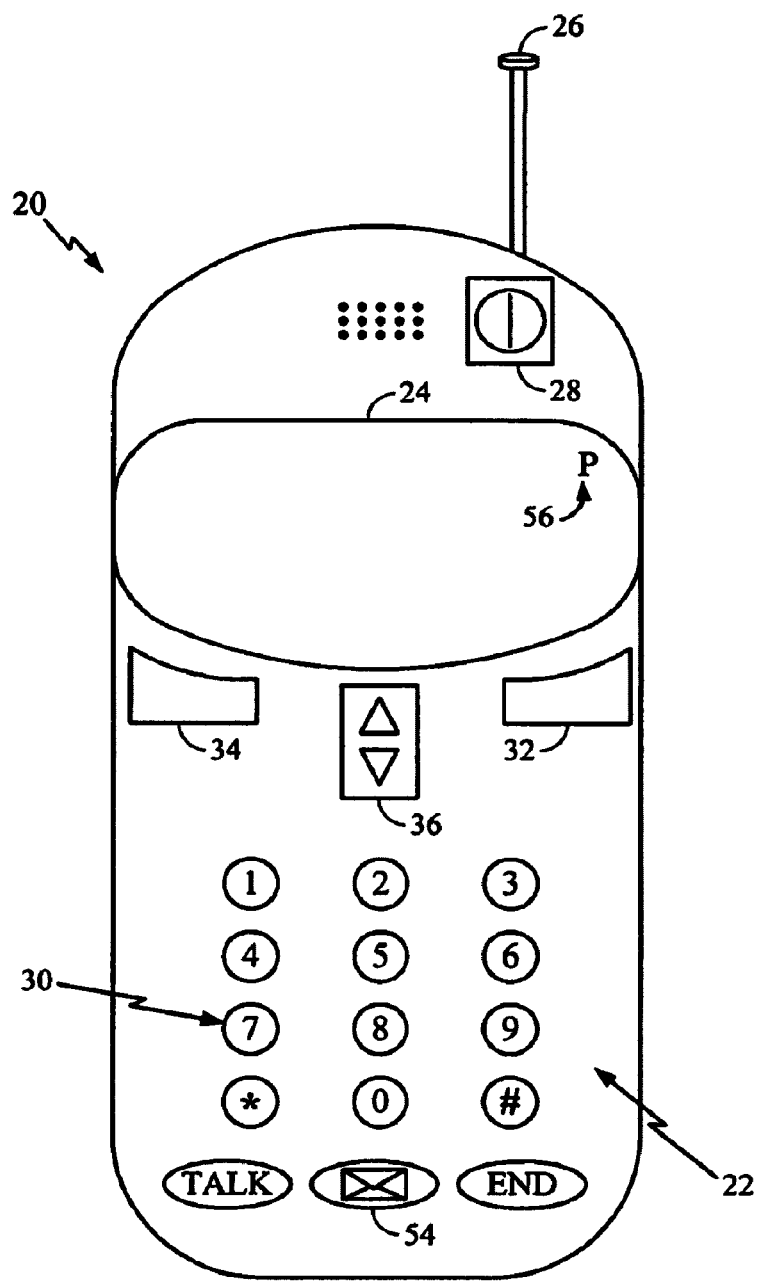
FIG. 2 is a front elevation view illustrating a typical cellular telephone handset.
Figure 3A:
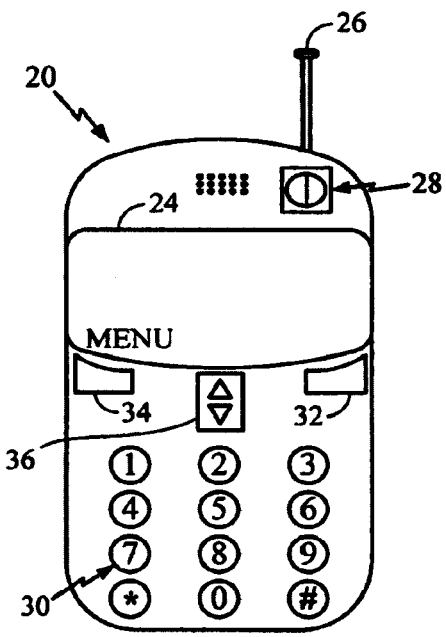
FIGS. 3a–3d are front elevation views illustrating a handset with a menu-driven user interface in the display section.
Figure 3B:
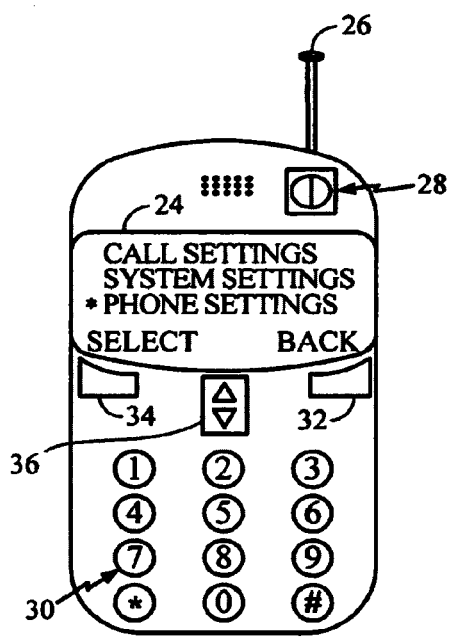
Figure 3C:
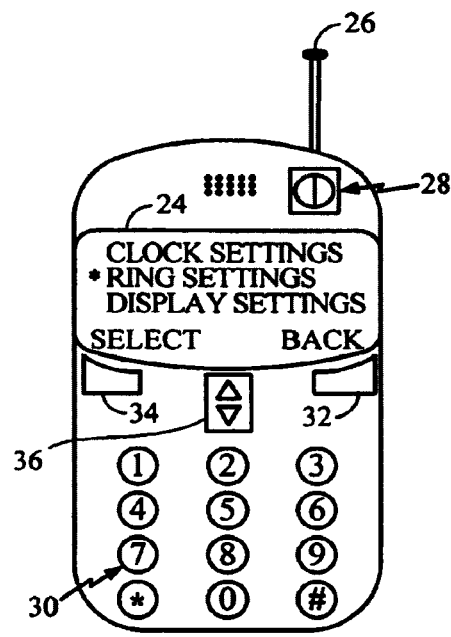
Figure 3D:
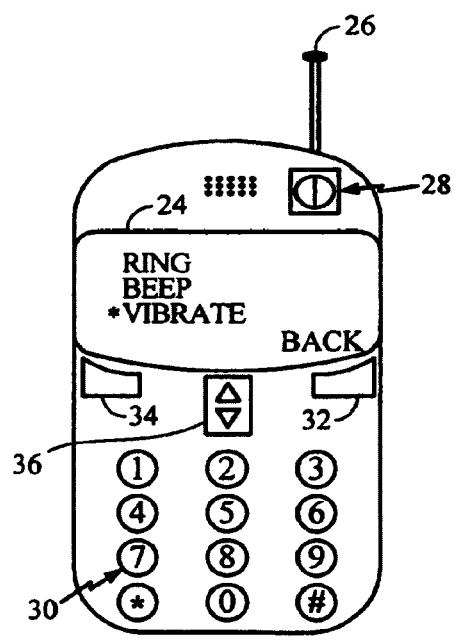

The controller 40 is also coupled with the user interface 46, which allows the controller 40 to receive input from or interface with the user. Referring back to FIG. 2, the user interface can be a keypad section 22 with defined and soft keys. In accordance with the invention, the controller 40 can be configured to receive from the user-interface 46 a designation, for example, of a macro key to a sequence of key presses corresponding to the selection of a feature or option. Once the macro key is designated, when a user presses the macro key, the controller receives the input from the user-interface 46, recalls the stored macro from the memory 42 and accordingly executes the corresponding sequence of key presses.

In a preferred embodiment, the handset 20 includes a display 24 and a keypad section 22, comprising a numerical keypad 30, an up/down navigation key 36 for menu scrolling, and two "soft" keys 32, 34. To record a macro, the user navigates to a "Record Macro" option as indicated on the display 24 and selects that item with the "SELECT" soft key 34. Instructions may be given on the display 24, such as, "press select to begin recording and then press and hold select to stop recording." The controller 40 then enters a programming mode and causes the display 24 to show a message alerting the user to begin entering a sequence of keys to be assigned to the macro. As an additional alert to the user, the controller 40 may cause the display 24 to show an icon 56 indicating that the handset 20 is in a programming mode. The instructions and alerts to the user notwithstanding, the controller 40 causes the display 24 to show the standby/idle screen with the "MENU" soft key 34 being displayed.

The user navigates the user interface menus in the standard fashion to accomplish the desired action and then presses and holds the "SELECT" soft key 34 to stop recording. A message such as "recording stopped" is displayed on the display 24 and the user is prompted to name the macro and assign a "short cut number" using the numeric keypad 30. A final message, such as "press and hold select to access shortcut" can be displayed on the display 24. The controller 40 stores the sequence of keys in the memory 42. When the controller 40 receives an input from the user interface 46 corresponding to the macro soft key 32, the list of macros is displayed on the display. The user can execute a macro by pressing the key or keys associated with the macro.

Figure 5:
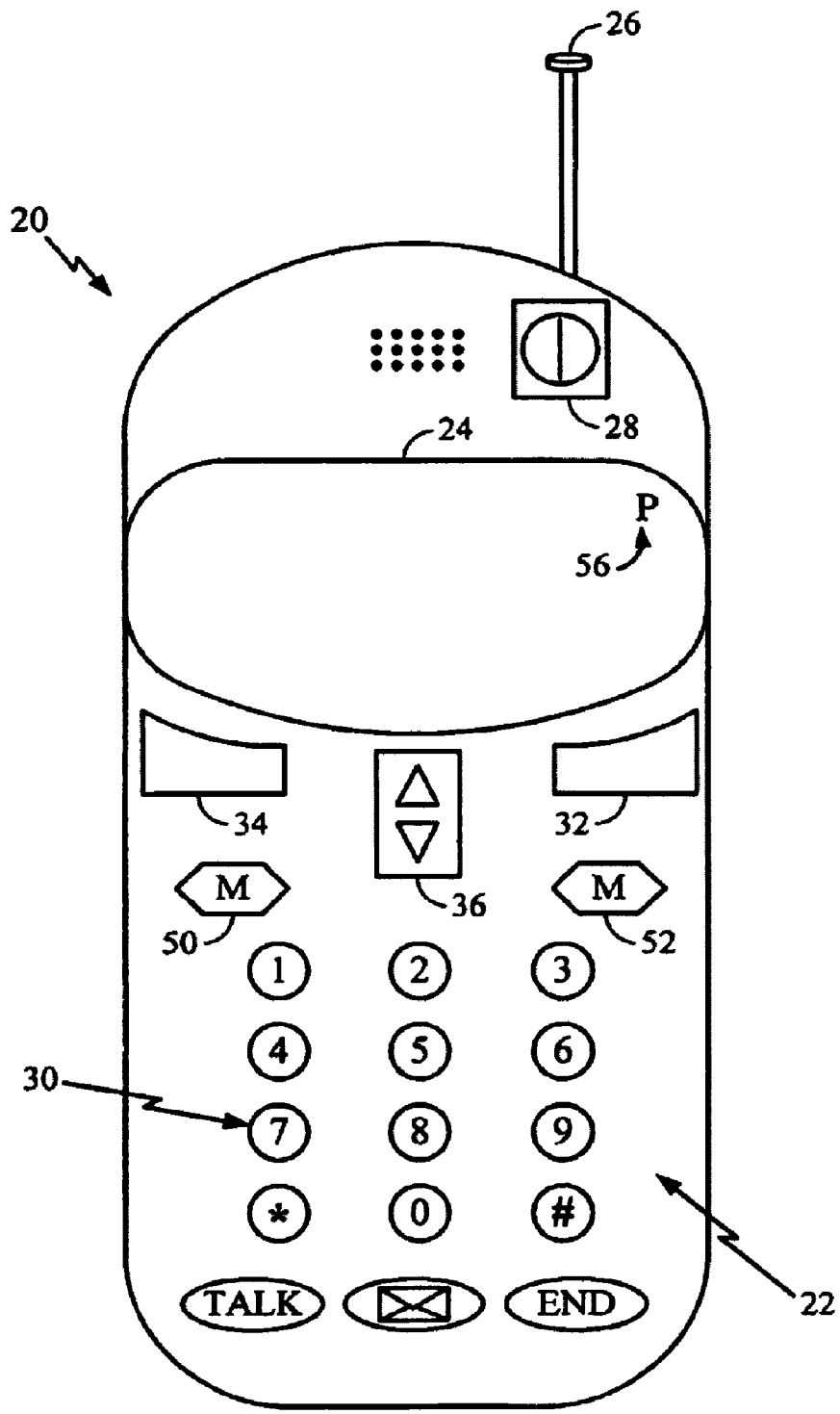
FIG. 5 is a front elevation view illustrating a handset according to the invention with macro "hot keys."

Referring to FIG. 5, the handset may comprise a dedicated "hot key" 50 to trigger the macro instead of a menu list. In this embodiment, the user would navigate to the "Record Macro" menu item and select that item with the "SELECT" soft key 34. Instructions may be given on the display 24 reading, "press select to begin recording and then press and hold select to stop recording." The user navigates the user interface menus in the standard fashion to accomplish the desired action and then presses and holds the "SELECT" soft key 34 to stop recording. A message reading "recording stopped" is displayed on the display 24. To access the macro, the user simply presses the macro "hot key" 50. The handset 20 can have one or several "hot keys" 50, with each "hot key" being programmed as above. Alternatively, the "hot key" 50 could be pressed followed by a number key from the numerical keypad 30 corresponding to the desired macro. Macros could be assigned to number keys from the numerical keypad 30 following the above steps.

In another embodiment of the invention, the "hot keys" 50 are programmed at the factory to perform commonly accessed or urgently needed functions. For example, the first "hot key" 50 may be programmed at the factory to place the handset 20 in vibrate mode, while the second macro key 52 is programmed to place the handset 20 in ring mode. Thus, each "hot key" 50, 52 is assigned a particular macro corresponding to a sequence of keys to access a particular feature or option. Alternatively, one "hot key" 50 may be programmed to toggle between vibrate mode and ring mode. If the handset 20 is in ring mode, the user can press the "hot key" 50 to switch to vibrate mode. On the other hand, if the handset 20 is in vibrate mode, the user can press the same "hot key" 50 to switch to ring mode. In such an arrangement, the second "hot key" 52 may either be used to serve another function (e.g., correspond to another macro) or be eliminated.

In another aspect of the invention, the invention may be implemented in a handset 20 which does not include the separate "macro" soft key 32 or "hot key" 50. For example, the invention may be implemented in the handset 20 shown in FIG. 2 by "overloading" existing keys. The following demonstrates how a user programs a macro according to an embodiment of the present invention.

As discussed above, the user enters the "Record Macro" menu and follows the steps as previously set forth. The message also instructs the user to press and hold one of the key pad 22 keys to be designated as the macro key when finished with the entry of the sequence of commands. For example, the "envelope key" 54 can be chosen to initiate macros. The user then proceeds with pressing the keys as if he were selecting the menu options to activate a feature or to change an option. To access the macro, the user presses the number given to the macro followed by the "envelope key" 54.

The user may desire to have a single shortcut for several actions such as setting the ringer volume to "low", turning the display/keypad backlighting on persistently, and launching a "chat" web page using the handset's integrated internet micro-browser. In that case, the user navigates the user interface menus to enter the programming mode and selects the keys in the standard fashion to accomplish all of these actions in the same way as discussed above. The user then can play this macro and perform all three operations.

In view of the above, it will be appreciated that the invention overcomes the longstanding problem in the industry of complicated and cumbersome menu-driven steps to access features or options of a personal wireless handset by providing an apparatus and method that allows the user to program or use macros to allow quick access to the desired feature or option using minimal keystrokes The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes that come within the meaning and range of equivalency of the claims are to be embraced within their scope.

What is claimed is:

1. A method of programming a macro to selectively operate features of a personal wireless communication handset, the method comprising the steps of:
   initiating a program mode in a controller of the handset;
   entering a sequence of inputs using a user interface, said sequence causing the controller to navigate up and down through multiple stages of a hierarchical menu structure in to activate a plurality of selected features in a predetermined sequence;
   storing said sequence of inputs in a memory; and
   defining a procedure for retrieving the sequence of inputs from the memory to navigate through the hierarchical menu structure in order to operate said selected features of the handset.

2. The method of claim 1 wherein the user interface is a keypad.

3. The method of claim 1 wherein the user interface is voice recognition device.

4. The method of claim 1 wherein the user interface is a stylus device.

5. The method of claim 2 wherein the procedure for retrieving the sequence of inputs uses a dedicated hot key.

6. The method of claim 2 wherein the procedure for retrieving the sequence of inputs uses a soft key.

7. The method of claim 2 wherein the procedure for retrieving the sequence of inputs uses an overloaded key on said keypad.

8. The method of claim 1 wherein a menu list displays macros stored in said memory.

9. The method of claim 8 wherein the menu list displays the defined procedure for retrieving a macro.

10. A personal communication handset comprising:
    a display;
    a user-interface;
    a controller coupled to the display and configured to communicate with said display so as to display a set of text descriptions allowing a user to view features of the personal communication handset, said controller also coupled to the user-interface and configured to receive commands front said user-interface to navigate up and down through multiple stages of a hierarchical menu structure in order to activate a plurality of selected features of said personal communication handset, said controller having a programming mode in which a user may enter a set of user-interface inputs for storage;
    a memory device coupled to the controller, such that said controller can retrieve data stored on said memory device and store data on said memory device; and
    a macro program stored in the memory device, said macro program comprising a set of user-interface inputs to navigate up and down through the hierarchical menu structure in order to control the selected features of the wireless communications device.

11. The personal communication handset of claim 10 wherein the user-interface is a keypad.

12. The personal communication handset of claim 11 further comprising a dedicated macro hot key on said keypad, the macro hot key configured to initiate the macro program.

13. A personal Communication handset comprising:
    a display;
    a user-interface;
    a controller in electrical communication with said display so as to cause said display to display a set of text descriptions defining features of the personal communication handset; said controller also receiving commands from said user-interface causing the controller to navigate up and down through multiple stages of a hierarchical menu structure in order to activate a plurality of selected features of said personal communication handset, said controller having a programming mode in which a user may enter a sequence of inputs using the user interface for storage;
    a memory device coupled to the controller, such that said controller can retrieve data stored on said memory device and store data on said memory device; and
    a program stored in the memory device for storing the sequence of inputs entered using the user-interface and for retrieving said sequence of inputs to navigate up and down through the hierarchical menu structure in order to control the selected features of the personal communication handset.

14. The personal communication handset of claim 13 wherein the user-interface is a keypad.

15. The personal communication handset of claim 14 further comprising a dedicated macro key on the keypad configured to initiate the procedure to retrieve the sequence of inputs.

16. A method of selectively operating features of a personal wireless communication handset, the method comprising the steps of:
    initiating a program mode in a controller of the handset;
    entering a sequence of inputs using a keypad on the handset, said sequence causing the controller to navigate up and down through multiple stages of a hierarchical menu structure in order to activate a plurality of selected features;
    storing said sequence of inputs in a memory;
    defining a procedure for retrieving the sequence of inputs from the memory; and
    pressing a key on the keypad to initiate the procedure for retrieving the sequence of inputs from the memory to activate the selected features of the handset, said procedure operative to access the selected features by navigating up and down through the hierarchical menu structure.

17. The method of claim 16 where the key on the keypad pressed to perform the macro is a dedicated hot key.

18. The method of claim 16 where the key on the keypad pressed to perform the procedure is a soft key.

19. A personal wireless communication handset comprising:
   a display;
   a keypad comprising a macro hot key;
   a controller coupled to the display and configured to communicate with said display so as to display a set of text descriptions allowing a user to view features of the personal wireless communication handset, said controller also coupled to the keypad and configured to receive commands from said keypad to navigate up and down through multiple stages of a hierarchical menu structure in order to activate a plurality of selected features of said personal wireless communication handset, said controller having a programing mode in which a user may enter a set of keypad inputs using the user interface for storage;
   a memory device coupled to the controller, such that said controller can retrieve data stored on said memory device and store data on said memory device; and
   a macro program stored in the memory device, said macro program comprising a set of keypad inputs to navigate up and down through the hierarchical menu structure in order to control the selected features of the wireless communications device, wherein the macro program is initiated by pressing a macro hot key.

20. A personal communication handset comprising:
   means for initiating a program mode in a controller of the handset;
   means for entering a sequence of inputs using a user interface, said sequence causing the controller to navigate up and down through multiple stages of a hierarchical menu structure in order to activate a plurality of selected features;
   means for storing said sequence of inputs in a memory;
   means for defining a procedure for retrieving the sequence of inputs from the memory; and
   means for initiating the procedure for retrieving the sequence of inputs from the memory so that the macro is performed to activate the selected features of the handset, said procedure operative to access the selected features by navigating up and down through the hierarchical menu structure.

21. A method of operating a specified feature of a personal wireless communication handset, the method comprising the steps of:
   programming a macro for operating a plurality of specified features of the handset comprising the steps of:
   initiating a program mode in a controller of the handset;
   entering a sequence of inputs using a user interface, said sequence causing the controller to navigate through one or more stages of a hierarchical menu structure;
   storing said sequence of inputs in a memory; and
   defining a procedure for retrieving the sequence of inputs from the memory to navigate up and down through multiple stages of the hierarchical menu structure in order to activate the selected features of the handset; and
   initiating operation of the macro so as to operate the specified features of the handset.

22. The method of claim 21 wherein the user interface is a keypad.

23. The method of claim 22 wherein the user interface is voice recognition device.

24. The method of claim 22 wherein the user interface is a stylus device.

25. The method of claim 23 wherein the procedure for retrieving the sequence of inputs uses a dedicated hot key.

* * * * *